(12) United States Patent
Barnsley

(10) Patent No.: US 9,207,900 B2
(45) Date of Patent: Dec. 8, 2015

(54) RENDERING GRAPHICAL DATA FOR PRESENTING FOR DISPLAY AT A REMOTE COMPUTER

(75) Inventor: Jeremy D Barnsley, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 170 days.

(21) Appl. No.: 13/516,071

(22) PCT Filed: Nov. 19, 2010

(86) PCT No.: PCT/GB2010/002147
§ 371 (c)(1),
(2), (4) Date: Jun. 27, 2012

(87) PCT Pub. No.: WO2011/073609
PCT Pub. Date: Jun. 23, 2011

(65) Prior Publication Data
US 2012/0262491 A1     Oct. 18, 2012

(30) Foreign Application Priority Data
Dec. 14, 2009    (GB) .................................. 0921831.4

(51) Int. Cl.
| | | |
|---|---|---|
| G09G 5/00 | (2006.01) |
| G06F 3/14 | (2006.01) |
| H04N 21/2343 | (2011.01) |
| H04N 21/258 | (2011.01) |
| H04N 21/2662 | (2011.01) |

(52) U.S. Cl.
CPC ........... *G06F 3/14* (2013.01); *H04N 21/234309* (2013.01); *H04N 21/234381* (2013.01); *H04N 21/25825* (2013.01); *H04N 21/2662* (2013.01); *G09G 2340/0435* (2013.01)

(58) Field of Classification Search
None
See application file for complete search history.

(56) References Cited

U.S. PATENT DOCUMENTS

| | | |
|---|---|---|
| 5,819,048 A | 10/1998 | Okazaki et al. |
| 6,046,709 A | 4/2000 | Shelton et al. |
| RE36,761 E | 7/2000 | Fujiwara |

(Continued)

FOREIGN PATENT DOCUMENTS

| | | |
|---|---|---|
| EP | 1 775 935 A2 | 4/2007 |
| EP | 2 020 799 A1 | 2/2009 |

(Continued)

OTHER PUBLICATIONS

International Search Report for PCT/GB2010/002147, mailed Feb. 4, 2011.

(Continued)

*Primary Examiner* — Stephen R Koziol
*Assistant Examiner* — Diana Hickey
(74) *Attorney, Agent, or Firm* — Nixon & Vanderhye P.C.

(57) ABSTRACT

A method and system for controlling the rendering of graphical data for remote display, e.g. for delivery over a network (6) to a remote client (7). At a source computer (1), graphical data is rendered and transmitted to the remote computer (7). At the remote computer (7), the transmitted rendered graphical data is received and presented for display. The rate of presenting at the remote computer (7) of the graphical data is monitored and the rate at which graphical data are rendered at the source computer (1) is controlled in response to the monitored rate of presenting at the remote computer (7).

17 Claims, 2 Drawing Sheets

(56) References Cited

U.S. PATENT DOCUMENTS

| | | |
|---|---|---|
| 6,850,564 B1 | 2/2005 | Pejhan et al. |
| 7,002,564 B1 | 2/2006 | Greenberg |
| 7,881,544 B2 | 2/2011 | Bashyam et al. |
| 2002/0097918 A1 | 7/2002 | Yokose |
| 2002/0109780 A1 | 8/2002 | Kaku |
| 2002/0150123 A1 | 10/2002 | Ro |
| 2004/0189677 A1 | 9/2004 | Amann et al. |
| 2004/0267952 A1 | 12/2004 | He et al. |
| 2005/0201414 A1 | 9/2005 | Awais |
| 2005/0226325 A1 | 10/2005 | Dei et al. |
| 2006/0168338 A1 | 7/2006 | Bruegl et al. |
| 2007/0003211 A1 | 1/2007 | Gregory |
| 2007/0094723 A1 | 4/2007 | Short et al. |
| 2007/0139427 A1 | 6/2007 | Sahashi |
| 2007/0153825 A1 | 7/2007 | Cho et al. |
| 2007/0206018 A1 | 9/2007 | Bajic et al. |
| 2007/0223574 A1 | 9/2007 | Roman et al. |
| 2007/0280255 A1 | 12/2007 | Tsang et al. |
| 2008/0120424 A1 | 5/2008 | Deshpande |
| 2008/0145078 A1 | 6/2008 | Tomita et al. |
| 2008/0273113 A1 | 11/2008 | Hayon et al. |
| 2009/0216897 A1 | 8/2009 | Wang |
| 2009/0274379 A1 | 11/2009 | Lock et al. |
| 2009/0309885 A1 | 12/2009 | Samson et al. |
| 2010/0063992 A1* | 3/2010 | Ma et al. .................. 709/203 |
| 2010/0150529 A1 | 6/2010 | Leichsenring et al. |

FOREIGN PATENT DOCUMENTS

| | | |
|---|---|---|
| EP | 2 098 994 A1 | 9/2009 |
| WO | 96/19080 | 6/1996 |
| WO | 03/049373 | 6/2003 |
| WO | 2009/098436 | 8/2009 |

OTHER PUBLICATIONS

JPEG-encoding.pdf ; Author: Wikipedia; Date: Jan. 15, 2010; p. 4 Encoding.

Extract from "Handbook of Image and Video Processing"; section 8.2, "Perceptual Criteria for Image Quality Evaluation" by Thrasyvoulos N. Pappas and Robert J. Safranek; pp. 669-673; 2000 by Academic Press (7 pgs.).

UK Search Report dated Mar. 8, 2010 issued in GB1000738.3 (1 pg.).

Office Action (15 pgs.) dated Mar. 26, 2014 issued in co-pending U.S. Appl. No. 13/522,887.

Poliakov, Andrew V. et al., "Server-based Approach to Web Visualization of Integrated 3-D Medical Image Data", Structural Informatics Group, Department of Biological Structure, University of Washington, Seattle, WA, 2001 AMIA, Inc. (6 pgs.).

Sullivan, Barry J. et al., "Effects of Image Preprocessing/Resizing on Diagnostic Quality of Compressed Medical Images", Ameritech, Hoffman Estates, IL; Bellcore, Morristown, NJ and The University of Chicago, Department of Radiology, Chicago, IL, 1995 IEEE (4 pgs.).

International Search Report dated May 23, 2011 for International Application No. PCT/GB2010/002283 (3 pgs.).

International Preliminary Report on Patentability (7 pgs.) dated Jul. 24, 2012 for International Application No. PCT/GB2010/002283.

Search Report (1 pg.) dated Apr. 14, 2010 issue for GB Application No. GB0921831.4.

* cited by examiner

RENDERING GRAPHICAL DATA FOR PRESENTING FOR DISPLAY AT A REMOTE COMPUTER

This application is the U.S. national phase of International Application No. PCT/GB2010/002147, filed 19 Nov. 2010, which designated the U.S. and claims priority to GB Application No. 0921831.4, filed 14 Dec. 2009, the entire contents of each of which are hereby incorporated by reference.

BACKGROUND AND SUMMARY

This invention relates to a method and system for controlling rendering of graphical data for remote display.

Some graphical applications (or their underlying network protocols) make use of a client-server architecture whereby graphical data, comprising a series of frames each representing an image, are rendered (i.e. generated) on a server computer but transported over a network for display on a remote client computer. One example of the server-client model occurs in the display of two-dimensional (2D) images derived from a three-dimension (3D) model, such as a 3D visualisation of seismic and other geophysical data. Such 3D visualisations generate huge datasets which are difficult to distribute in an efficient manner, particularly over data networks. To address this difficulty, 2D images are rendered from the 3D visualisation at the server for distribution to one or more remote clients where the 2D images can be viewed.

There are a number of flow-control methods aimed at matching data rates in one, upstream part of a network to the capacity to handle the data at another, downstream part of the network. These known flow-control methods follow one of two strategies for dealing with excessively high data rates, i.e. buffering or discarding of data. Each of these methods brings significant disadvantages when the data is composed of a sequence of frames of graphical data representing a moving image (e.g. a representation of the rotation of an object). The discarding of data will result in loss of frames and lead to non-linear frame delivery manifesting itself in jumps in the moving image. Buffering at either end of a network link can remove or reduce the need to discard data but, particularly with high latency networks, buffering can still result in non-linear frame delivery manifesting in stuttering (i.e. significant changes in the rate of display of images) or jumps in a moving image. It is therefore desirable to provide a method and system for controlling the rendering of graphical data for delivery over a network such that stuttering or jumping of a resultant image is reduced or eliminated.

A method and system for controlling the rendering of graphical data for remote display e.g. at a remote client, is disclosed. According to a first aspect, a method of controlling rendering of graphical data for remote display comprises: at a source computer: rendering graphical data and transmitting the rendered graphical data to a remote computer. At the remote computer: receiving the transmitted rendered graphical data, presenting the graphical data for display and monitoring the rate of presenting at the remote computer of graphical data for display. Receiving at the source computer information on the rate of presenting for display at the remote computer of the transmitted graphical data; and controlling the rate at which graphical data are rendered at the source computer in response to the monitored rate of presenting for display at the remote computer.

The rate at which images are presented for display at the remote computer will be limited according to at least one of (i) the rate at which the images are transferred to the remote computer and (ii) the rate at which the remote computer processes received images for display. According to the above method, images are rendered at the server at a rate that is controlled using the rate at which images are presented for display, as monitored, at the client. Rather than seeking to control the flow of data between server and client, the rate of rendering of graphical data at the server is controlled. The resulting system removes or reduces the requirement for buffering or dropping frames so that a sequence of frames can be provided to the display smoothly, avoiding jumps and significant changes in the rate of display of the images leading to stuttering.

According to a second aspect, a method of controlling rendering of graphical data for remote display comprises, rendering graphical data at a source computer and transmitting the rendered graphical data to a remote computer for display. Receiving information on the rate of presenting for display at the remote computer the transmitted graphical data and controlling the rate at which graphical data are rendered at the source computer in response to the received information on the rate of presenting for display at the remote computer.

According to a further aspect, a system for rendering graphical data for presenting for display at a remote computer comprises: a graphics application for rendering graphical data; an output interface for transmitting the rendered graphical data to the remote computer; an input interface for receiving information on the rate of presenting for display at the remote computer of the transmitted graphical data; and a control application for limiting the rate at which graphical data are rendered by the system in response to the received information on the rate of presenting data at the remote computer.

BRIEF DESCRIPTION OF THE DRAWINGS

Embodiments of the invention will now be described, by way of example, with reference to the accompanying drawings in which.

DETAILED DESCRIPTION OF PRESENT EXAMPLE EMBODIMENTS

Figure 1:
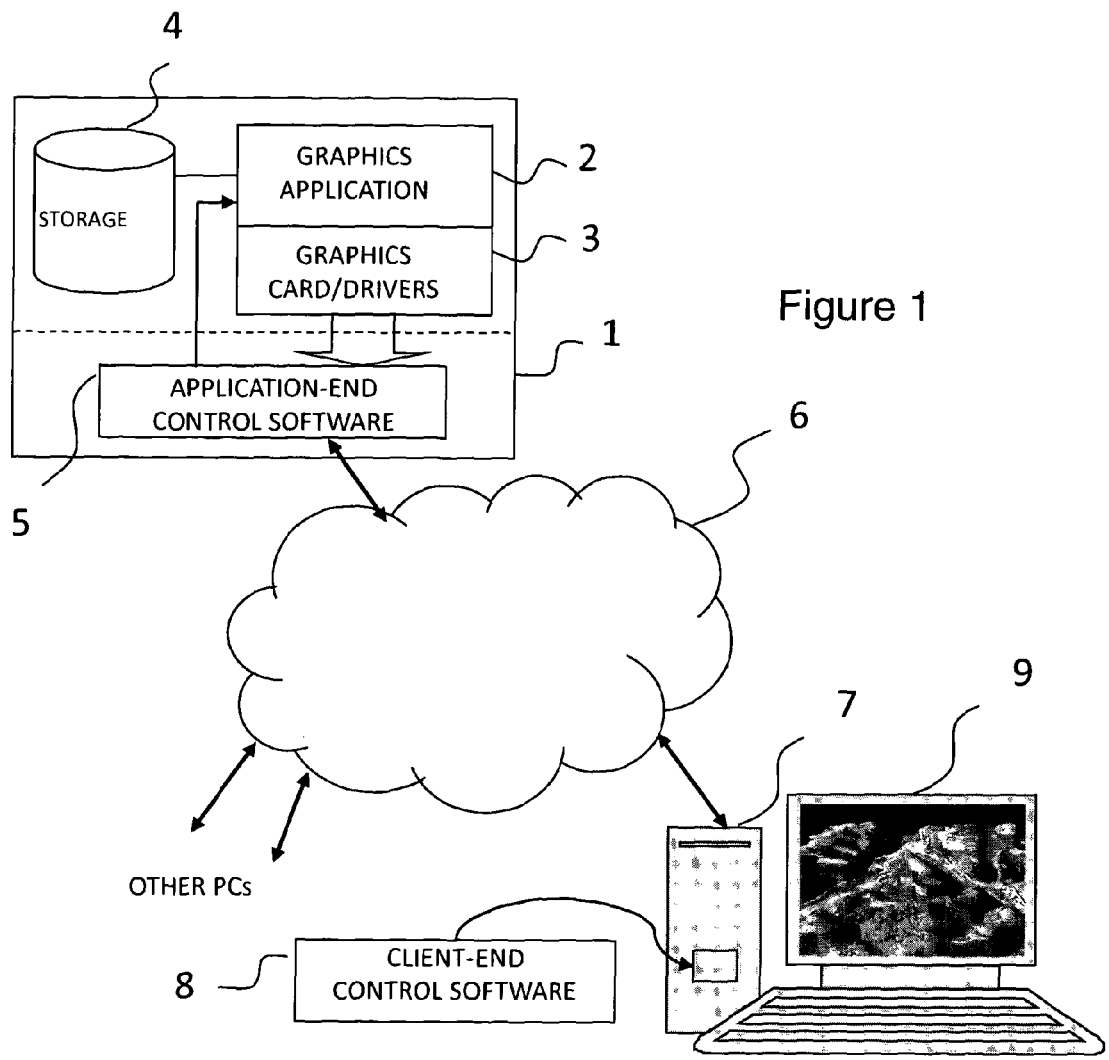
FIG. 1 is a block diagram of a system according to the invention.

FIG. 1 shows a computer apparatus 1 such as a workstation or server for rendering and sending via network 6 a sequence of frames of graphical data representing images for display at remote client 7 according to a first embodiment of the invention.

As will be described in detail, below, server 1 is arranged to render images at a rate that is controlled using the rate at which images are presented for display at client 7. Server 1 comprises a general purpose computer with a processor (not shown) arranged to execute program code, which comprises graphics application program 2 and application-end control software 5, stored in local memory (typically semiconductor memory, not shown) to perform rendering and despatch of images to client 7. Client 7 comprises a general purpose computer with a processor (not shown) arranged to execute program code, which comprises client-end control software 8, stored in local memory (typically semiconductor memory, not shown) to perform receipt and processing for display at display 9 (for example a high-resolution CRT or plasma display) of images received via network 6, for example the Internet or a private data network. Network 6 is typically based on TCP/IP but could, alternatively, be based on another suitable protocol such as UDP when provided with suitable support for flow control and retransmission. The Internet, in particular, exemplifies a type of low-bandwidth, high-latency network which can result in delayed and lost data that adversely affect the transport of images to an extent that is largely unpredictably.

Server 1 comprises graphics application program 2 for controlling the rendering of images. The images are rendered, for example, from data held in storage device 4 (e.g. hard disk drive or semiconductor memory) representing a 3D model. Rendering of the images is implemented by graphics card/drivers 3 in collaboration with graphics application program 2 under the control of application-end control software 5. Application-end control software 5 delivers the rendered images (with or without compression of some sort) to client 7 over network 6. Application-end control software 5 also monitors the rate at which frames are rendered by the combination of components 2, 3 and 4. The frame rendering rate is monitored over a monitoring period of, say, two seconds and the average value (i.e. the number of frames rendered over the monitoring period divided by the number of seconds in the monitoring period) recorded at server 1 in local memory (not shown). The averaged value advantageously reduces the effect of short-term deviations. The internal structure of server 1 and client 7 is described in more detail, below, with reference to FIG. 2.

The display rate (i.e the rate at which frames are presented for display on client display 9) is monitored by client-end control software 8 over a monitoring period of, say, two seconds and the average value (i.e. the number of frames displayed over the monitoring period divided by the number of seconds in the monitoring period) recorded by client-end control software 8. The averaged value advantageously reduces the effect of short-term deviations. The display rate will be influenced by one or more of (a) the rate at which frames are rendered by server 1; (b) the rate at which frames are transported over network 6; and (c) the rate at which frames are processed for display by client 7. It will be appreciated that rate (b) will in general not exceed rate (a), and rate (c) will not in general exceed rate (b)—although there may be short-term deviations. At any one time, however, one of these rates will be determinant of the maximum rate at which the client is able to present images for display. The averaged display rate will tend to a value that does not exceed the lowest of the three influential rates (a), (b) and (c) listed above, although, depending on conditions, the averaged display rate may intermittently exceed one or more of the influential rates.

Client-end control software 8 sends to server 1 via network 6 details of monitored client activity including the rate at which frames are presented for display on client display 9. The monitored display rate is communicated by client-end control software 8 on a regular basis (preferably, as soon as the values are available, e.g. every two seconds) over network 6. The communication will preferably not impact the delivery of graphical data from server 1 and could, for example, be arranged over a separate channel to the graphics delivery and in a separate thread. Application-end control software 5 receives the monitored display rate information at server 1 and modifies the frame rendering rate limit accordingly.

Although, for a particular set of influential rate values, the display rate will generally be maintained constant, occasional frames may be dropped (e.g. due to transport effects such as buffering) when the system is operating at, or close to, its maximum performance capability (as determined by server frame rendering, network transport or client processing capabilities). Rather than exactly matching the frame rendering rate limit to the monitored display rate, the limit is preferably set to a lower value that ensures the system operates slightly below its maximum performance thereby reducing the risk of dropped frames. A preferred level is in the range three to five percent below the maximum. According to a preferred embodiment, limiting the frame rendering rate is achieved by inserting an appropriate delay in the frame rendering process in order to slow the rendering rate to the desired value.

Limitation of the frame rendering rate is preferably implemented in accordance with the following rules:

When a first set of monitored values is received from the client, i.e. following start-up or a change of image size, no frame rendering limit is imposed initially. This is to allow the system's maximum display capability to be monitored. Upon reception of subsequent, monitored values a frame rendering limit is imposed, as appropriate. This results in a, typically, two-second period during which the rendering of frames is not limited as described above. This could, in theory, result in stuttering and jumping in the displayed image, however, this short initial period is generally not of sufficient duration for non-linearities in the system to generate noticeable stuttering or jumping effects in the displayed image.

When no frame rendering rate limit is in force and the first, unlimited monitored output value (corresponding to the system's maximum display capability) has been received, set the frame rendering rate limit at 3% less than the received client display rate (clientfps)

When a frame rendering rate limit is in force, the difference (diff) between the current frame rendering rate limit (tunedfps) and the received client display rate (clientfps) is calculated, where diff=tunedfps−clientfps;

i. If the 'diff' is within the a tolerance range (for example if abs(diff)<clientfps/1000), then increase the frame rendering rate limit by 2% ii. If the 'diff' is larger than the tolerance range, and is negative, increase the frame rendering rate limit by 4% iii. If the 'diff' is larger than the tolerance range and positive, decrease the frame rendering rate limit by 5%

The percentages quoted above are given by way of example only and fine tuning of these values may be required in certain circumstances. As can be seen from the above, the currently imposed frame rendering rate limit is, preferably, continually checked against the monitored client display rate value to allow for changes in the ability of the client to display frames (e.g. due to changes in the performance of the network or of the client).

As can be seen from rule (i), where the display rate (clientfps) and the rendering rate limit (tunedfps) are closely matched, the frame rendering rate limit gradually increases. As can be seen from rule (ii), where the display rate (clientfps) is significantly above the rendering rate limit (tunedfps), the frame rendering rate limit is increased more rapidly. As can be seen from rule (iii), where the display rate (clientfps) is significantly below the rendering rate limit (tunedfps), the rendering rate limit is reduced.

This is an iterative process arranged to track variations over time in the maximum performance level and can result in the frame rendering limit value oscillating around the actual maximum performance level value. For example, say the server starts up with an initial frame rendering rate of 20 frames per second (fps) and the client can only present received frame for display at 10 fps. The display rate is reported to the server which, after an initial two seconds, sets a frame rendering rate limit 3% less than 10 fps, i.e. 9.7 fps. The client can present received frame for display at 9.7 fps, and returns a display rate value of 9.7 fps to the server. The server receives the 9.7 fps value from the client and (implementing rule (i)) increase the frame rendering rate by 2% to 9.9 fps. We now describe a sequence of subsequent steps determined by the rules set out, above, which result in a series of variations in the frame rendering rate limit ending with a return (e.g. loop) back to a value of 9.9 fps.

The client can possibly cope with presenting received frames for display at 9.9 fps and returns a display rate value of 9.9 fps. In response, the server again increases the frame rendering rate to 10.1 fps. The client cannot present frames for display at 10.1 fps and continues to return a display rate value of 9.9 fps. The server now detects that the display rate is less than the rendering rate limit and (implementing rule (iii)) reduces the rendering rate limit by 5% to 9.95 fps. The client now returns a display rate value of 9.95 fps to the server and, in response, the server increases (implementing rule (i)) the frame rendering rate to 9.97 fps. The client returns a display rate value of 9.97 and (again implementing rule (i)) the server increases the frame rendering rate to 9.9. The system has thus returned to the same value (9.9 fps) for the frame rendering rate which existed at the start of the loop. As indicated, above, the system oscillates about (i.e. above and below) the maximum performance level—mostly keeping slightly below.

It is therefore apparent that, for any value of display rate, the system will modify the rendering rate limit and monitor the result of the modification. If the resulting rendering rate is too high, the system will reduce the limit until a slight undershoot occurs, whereupon the system will increase the limit until a slight overshoot occurs and so on. The above set of rules and the resultant controlled "oscillation" of the rendering rate about the maximum performance level advantageously provide fast tracking of changes in the maximum performance level whilst avoiding unacceptable degradation in the displayed images.

Preferably, client 7 communicates the monitored display rate value together with information on image height and width so that server 1 is able to detect changes in the image size. Alternatively, the server could track the size of images being rendered and synchronise a change in image size at the server with the appropriate monitoring period on the client. If the size of the image being delivered to the client changes, the current monitored values become invalid and any frame rendering rate limit is removed in order to allow the maximum system capability to be correctly monitored with the new image size for a short period before a new limit is imposed.

Figure 2:
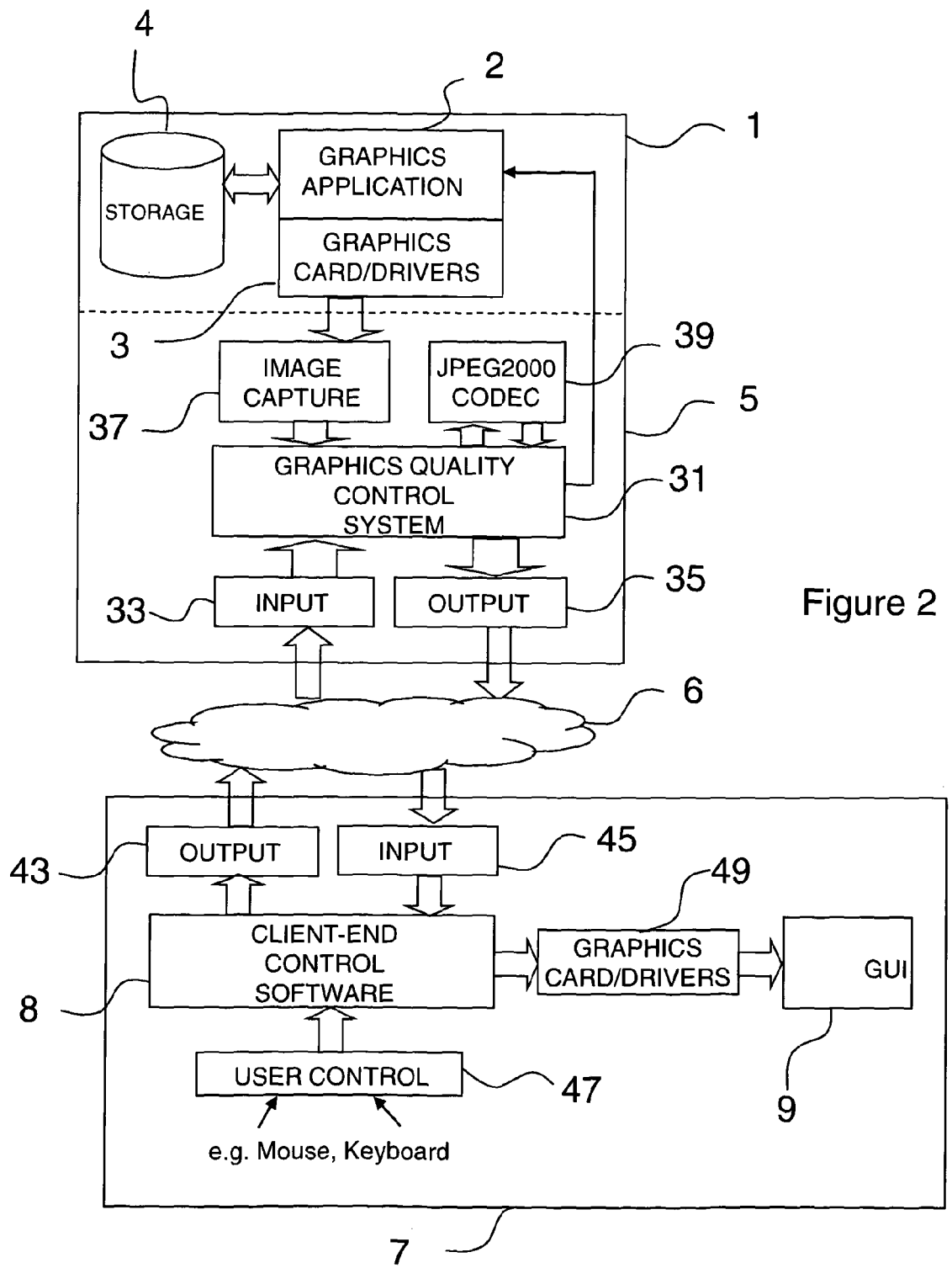
FIG. 2 is a block diagram showing, in further detail, functional components of the system shown in FIG. 1.

Referring to FIG. 2, functional components of the server 1 and client 7 are shown in greater detail. In server 1, components of the application-end control software 5 include an image capture component 37, an optional codec 39, a graphics quality control system 31 (hereafter referred to simply as the QCS) and input and output interfaces 33, 35. Image processing at server 1 optionally employs compression to control the amount of data that needs to be transmitted over network 6. The codec may be implemented in hardware or software and represents any device or program capable of suitably encoding digital data. JPEG2000 is a suitable codec algorithm for encoding captured images but, in principle, other compression codecs, such as standard JPEG, may be employed.

At client 7, client-end control software 8 transmits and receives data to/from network 6 via respective output and input interfaces 43, 45. Transmitted data may include user settings and/or user control signals 47, the latter resulting from, for example, mouse or keyboard inputs associated with a user manipulating the 3D model being represented on display 9. Data received by client-end control software 8 comprises image data transmitted from application-end control software 5 representing updated images of the model for display on a display 9 using a suitable graphics card/driver 49.

When the user interacts with the 3D model, for example to rotate the model to a different viewing angle using mouse or keyboard, the resultant control signals are transmitted from client-end control software 8 to both the graphics application 2 (i.e. to identify how the model is to be translated and which new images need to be acquired from storage) and to the QCS 31. In response, graphics application 2 acquires the new data from storage 4, outputs the visualisation using graphics card 3 after which each image is optionally captured and compressed by the codec 39. According to a further aspect, only the resizing of a window is detected with other user interactions being determined by comparing the previous frame to the current frame. Each image is transmitted by QCS 31 to client-end control software 8.

The above embodiments are to be understood as illustrative examples to aid understanding of the invention. Further embodiments of the invention are envisaged and will be evident to the skilled reader. It is to be understood that any feature described in relation to any one embodiment may be used in combination with one or more features of another of the embodiments, or any combination of the embodiments. Furthermore, equivalents and modifications not described above will be evident to the skilled reader and may also be employed without departing from the scope of the invention, which is defined in the accompanying claims. Control software 8 which monitors the rate at which frames are presented for display on client display 9 may be located elsewhere than on client 7. Client display 9 may be located integral with or as a separate unit to client 7.

As will be understood by those skilled in the art, the invention may be implemented in computer program product software, any or all of which may be contained on various storage media so that the program can be loaded onto one or more computers or could be downloaded over a computer network using a suitable transmission medium. The computer program product software used to implement the invention may be embodied on any suitable carrier, readable by a suitable computer input device (not shown), such computer program product comprising optically, magnetically or otherwise readable marks.

What is claimed is:

1. A method of controlling rendering of graphical data for remote display comprising:
   at a source server computer:
      rendering graphical data and transmitting the rendered graphical data to a remote client computer;
   at the remote client computer:
      receiving the transmitted rendered graphical data;
      presenting the graphical data for display; and
      monitoring the rate of presenting at the remote client computer of graphical data for display;
   at the source server computer:
      receiving information on the rate of presenting for display at the remote client computer of the transmitted graphical data; and
      controlling the rate at which graphical data are rendered at the source server computer in response to the monitored rate of presenting for display at the remote client computer;
      monitoring the size of an image to be displayed at the remote client computer and, upon detecting a change in the image size, removing control of the rate at which graphical data are rendered at the source server computer to allow graphical data to be rendered at the source server computer at an uncontrolled rate;

following removal of control of the rate at which graphical data are rendered at the source server computer, receiving at the source server computer information on the rate of presenting for display at the remote client computer of transmitted graphical data rendered at the source server computer at the uncontrolled rate; and subsequently controlling the rate at which graphical data are rendered at the source server computer in response to the information received at the source server computer on the rate of presenting for display at the remote client computer the transmitted graphical data rendered at the source server computer at the uncontrolled rate.

2. The method as claimed in claim 1 in which the rate at which graphical data are rendered at the source server computer is controlled by setting a maximum limit on the rate.

3. The method as claimed in claim 2 in which the maximum limit is set to either the monitored rate of presenting for display at the remote client computer or a value below the monitored rate of presenting for display at the remote client computer.

4. The method as claimed in claim 2 including iteratively increasing the frame rendering rate limit until the frame rendering rate limit exceeds the monitored rate of presenting for display at the remote client computer.

5. The method as claimed in claim 4 including, when the frame rendering rate limit exceeds the monitored rate of presenting for display at the remote client computer reducing the frame rendering rate limit.

6. The method as claimed in claim 1 including producing in successive iterations, values for the frame rendering rate limit which oscillate around a maximum rate at which the remote client computer is capable of presenting graphical data for display.

7. A method of controlling rendering of graphical data for remote display comprising:

at a source server computer, rendering graphical data;

transmitting the rendered graphical data to a remote client computer for display;

receiving information on the rate of presenting for display at the remote client computer the transmitted graphical data and controlling the rate at which graphical data are rendered at the source server computer in response to the received information on the rate of presenting for display at the remote client computer;

at the source server computer: monitoring the size of an image to be displayed at the remote client computer and, upon detecting a change in the image size to a new image size, removing control of the rate at which graphical data are rendered at the source server computer to allow graphical data to be rendered at the source server computer at an uncontrolled rate;

following removal of control of the rate at which graphical data are rendered at the source server computer, receiving at the source server computer information on the rate of presenting for display at the remote client computer transmitted graphical data rendered at the uncontrolled rate; and subsequently controlling the rate at which graphical data are rendered at the source server confuter in response to the information received at the source server computer on the rate of presenting for display at the remote client computer the transmitted graphical data rendered at the uncontrolled rate.

8. The method as claimed in claim 7 in which the rate at which graphical data are rendered at the source server computer is controlled by setting a maximum limit on the rate.

9. The method as claimed in claim 8 in which the maximum limit is set to one of the monitored rate of presenting for display at the remote client computer and a value below the monitored rate of presenting for display at the remote client computer.

10. The method as claimed in claim 8 including iteratively increasing the frame rendering rate limit until the frame rendering rate limit exceeds the monitored rate of presenting for display at the remote client computer.

11. The method as claimed in claim 10 including, when the frame rendering rate limit exceeds the monitored rate of presenting for display at the remote client computer reducing the frame rendering rate limit.

12. The method as claimed in claim 7 including producing in successive iterations, values for the frame rendering rate limit which oscillate around a maximum rate at which the remote client computer is capable of presenting graphical data for display.

13. A non-transitory computer program storage medium storing a computer program or suite of computer programs which upon execution by one or more computers perform the method steps as claimed in claim 1.

14. A non-transitory computer program storage medium storing a computer program or suite of computer programs which upon execution by one or more computers perform the method steps of claim 7.

15. The method as claimed in claim 3 including iteratively increasing the frame rendering rate limit until the frame rendering rate limit exceeds the monitored rate of presenting for display at the remote client computer.

16. The method as claimed in claim 9 including iteratively increasing the frame rendering rate limit until the frame rendering rate limit exceeds the monitored rate of presenting for display at the remote client computer.

17. A system for rendering graphical data for presenting for display at a remote client computer, the system comprising:

a processing system, including a computer processor, the processing system being configured to:

render graphical data;

output the rendered graphical data to the remote client computer;

receive information on the rate of presenting for display at the remote client computer of the outputted graphical data;

limit the rate at which graphical data are rendered by the system for rendering graphical data in response to the received information on the rate of presenting data at the remote client computer;

monitor the size of an image to be displayed at the remote client computer;

upon detection of a change in the size of the image to a new image size, remove control to allow the rate at which graphical data are rendered at the source server computer to be an uncontrolled rate; and subsequently control the rate at which graphical data are rendered at the source server computer in response to information received at the source server computer on the rate of presenting for display at the remote client computer outputted graphical data rendered at the uncontrolled rate.

* * * * *